United States Patent [19]
Kumazaki

[11] Patent Number: 5,498,212
[45] Date of Patent: Mar. 12, 1996

[54] POWER TRANSMISSION BELT WITH REINFORCING FIBERS

[75] Inventor: Toshimi Kumazaki, Hyogo, Japan

[73] Assignee: Mitsuboshi Belting Ltd., Nagata, Japan

[21] Appl. No.: 318,476

[22] Filed: Oct. 5, 1994

[30] Foreign Application Priority Data

Oct. 6, 1993 [JP] Japan .................................... 5-276103

[51] Int. Cl.6 ..................................................... F16G 1/08
[52] U.S. Cl. ........................................... 474/263; 474/271
[58] Field of Search ..................................... 474/263, 265, 474/271, 273

[56] References Cited

U.S. PATENT DOCUMENTS

| | | | |
|---|---|---|---|
| 4,024,773 | 5/1977 | Hartman et al. | 474/265 X |
| 4,083,260 | 4/1978 | Carlson et al. | 474/265 X |
| 4,127,039 | 11/1978 | Hollaway, Jr. | |
| 4,137,787 | 2/1979 | Waugh | 474/265 X |
| 4,798,566 | 1/1989 | Sedlacek | 474/238 |
| 4,871,004 | 10/1989 | Brown et al. | 152/209 R |
| 5,016,708 | 5/1991 | Baer et al. | 474/264 X |
| 5,173,361 | 12/1992 | Yamashita et al. | 474/265 X |
| 5,197,928 | 3/1993 | Mishima et al. | 474/263 |
| 5,310,386 | 5/1994 | Mizuno et al. | 474/205 |

FOREIGN PATENT DOCUMENTS

| | | |
|---|---|---|
| 91337401 | of 0000 | . |
| 0317316 | 5/1989 | European Pat. Off. . |
| 0445417A1 | 11/1991 | European Pat. Off. . |
| 3535676A1 | of 0000 | Germany . |
| 50-08294 | of 1975 | Japan . |
| 5-59012 | 8/1993 | Japan . |

Primary Examiner—Roger J. Schoeppel
Attorney, Agent, or Firm—Wood, Phillips, VanSanten, Clark & Mortimer

[57] ABSTRACT

A power transmission belt having a body with a length and laterally oppositely facing pulley engaging surfaces. The body has at least a portion thereof that is made from rubber. Aramid fibers are embedded in the rubber portion of the body in an amount of 5–20 parts by weight, and more preferably 8–15 parts by weight, of aramid fiber per 100 parts by weight of rubber.

22 Claims, 2 Drawing Sheets

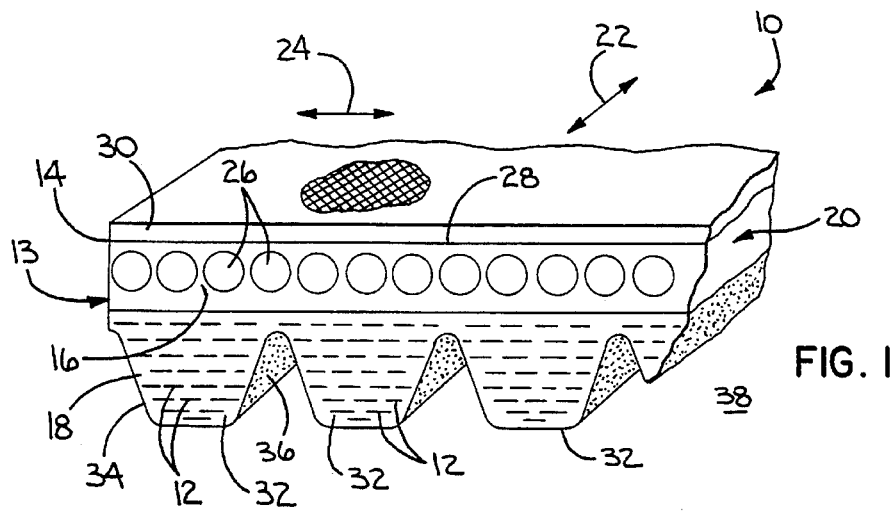
FIG. 1
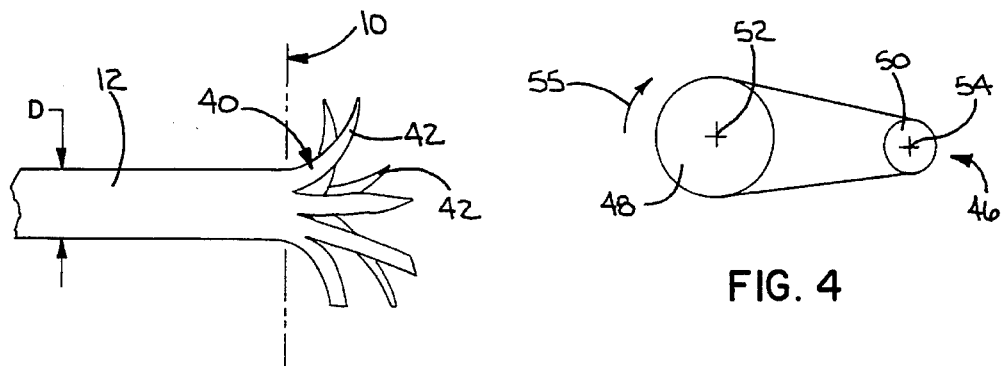
FIG. 2
FIG. 4
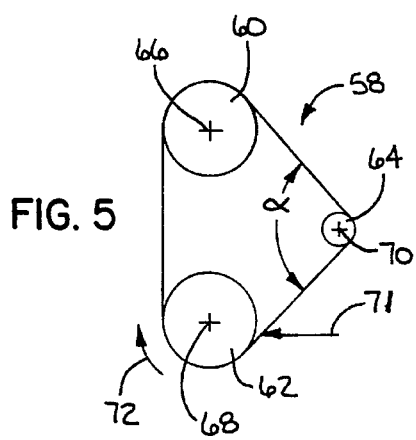
FIG. 5
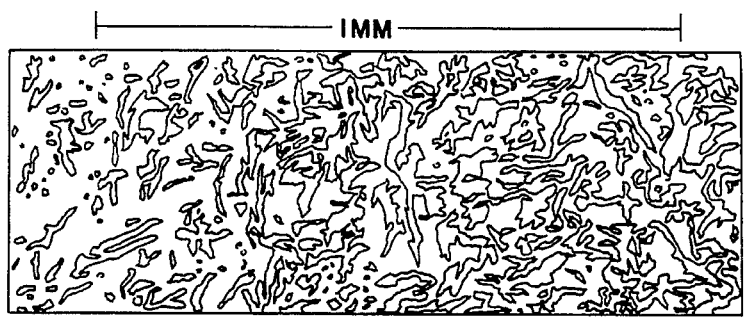
FIG. 3

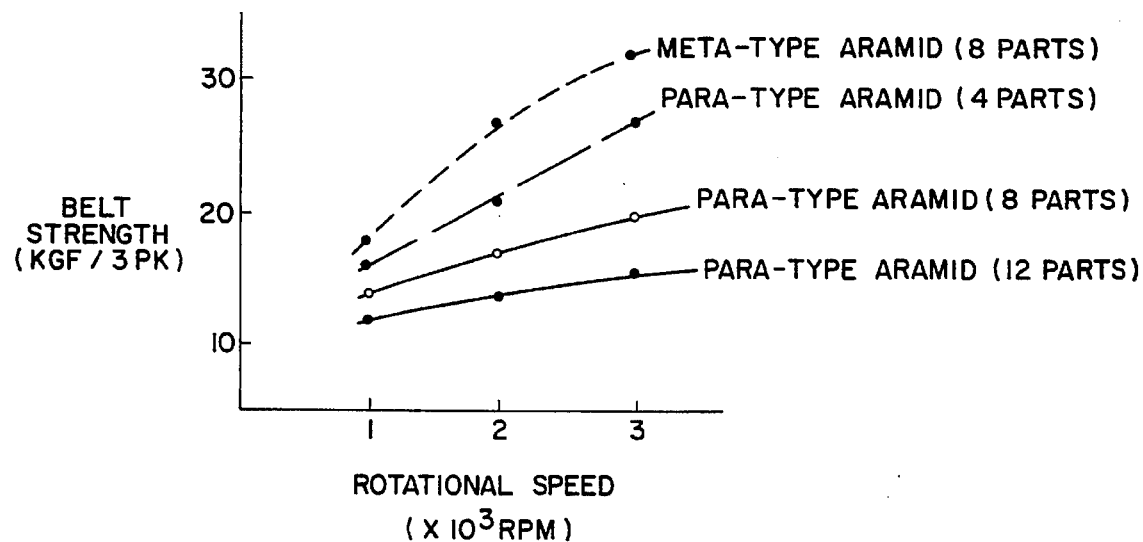
FIG. 6
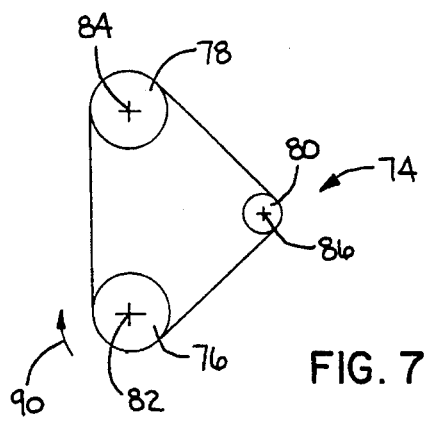
FIG. 7
FIG. 8
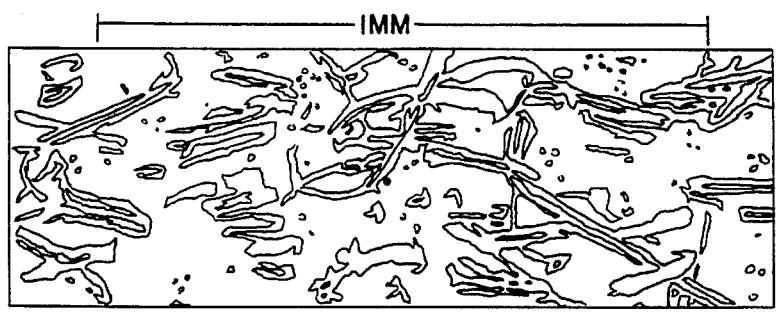

POWER TRANSMISSION BELT WITH REINFORCING FIBERS

BACKGROUND OF THE INVENTION

FIELD OF THE INVENTION

This invention relates to power transmission belts and, more particularly, to a belt having short, aramid, reinforcing fibers embedded therein.

BACKGROUND ART

V-fibbed belts have a wide range of use in many different environments. A V-fibbed belt has good power transmission capabilities by reason of its multiple fibs, which account for an increased contact area, between the belt and a cooperating pulley, over other types of belts. It is the frictional forces between the engaging belt and pulley surfaces which cause the belt to drive/be driven by cooperating pulleys.

The V-fibbed belt normally has a thin profile which makes it resistant to flexing fatigue and particularly suitable for use on small diameter pulleys. At the same time, the V-fibbed belt is capable of transmitting large forces and will operate effectively at high speeds.

The V-fibbed belt can be highly tensioned through a fixed pulley when it is initially assembled, thereby avoiding a low tension condition thereafter. This highly tensioned belt is prone to adhesion wearing in use and tends to generate significant amounts of noise. Further, when the belt and cooperating pulley are exposed to water, as is common in many normal operating environments for such belts, the belt slips in use and thereby generates unwanted noise.

Various attempts have been made to overcome these problems. In Japanese Utility Model Laid-Open No. 4-55475, a power transmission belt is disclosed in which powdered adhesion inhibiter, such as talc, calcium carbonate, clay or silica, is applied to the pulley engaging side surfaces of V-shaped ribs.

The use of an adhesion inhibiter has some inherent problems. Most significantly, it is difficult to make an even application of the adhesion inhibiter on the belt.

Another attempted solution to the above problems is disclosed in Japanese Utility Model Laid-Open No. 5-59012. A power transmission belt is disclosed therein in which short aramid fibers are embedded in a belt compression layer to improve wear resistance and lateral pressure resistance, and to suppress noise generation.

While the aramid fibers to a certain extent do improve wear resistance and lateral stability, they themselves tend to generate noise. This is due to the highly rigid nature of the aramid fibers. The exposed aramid fibers produce a scraping noise on a cooperating pulley, which noise is highly irritating.

An attempted solution to this latter problem is also disclosed in Japanese Utility Model Laid-Open No. 5-59012. This suggested solution involves the use of different types of short aramid fibers in different portions of the compression layer in which they are embedded. More specifically, short, para-type aramid fibers, which are readily fibrillated, are embedded near the free ends of the ribs in the compression layer. Shoa, meta-type aramid fibers, which are not readily fibrillated, are embedded in the rubber near the base of the ribs in the compression layer.

This latter attempted solution introduces additional problems. First of all, belt manufacture is complicated by reason of requiring mixing of different fibers in separate operations to define different portions of the belt.

Further, the meta-type aramid fibers, which are not readily fibrillated, extend into the grooves between adjacent ribs, thereby tending to fill the belt grooves. This may prevent proper seating of cooperating pulley ribs, which condition may ultimately cause the belt to disengage from a pulley.

Additionally, the meta-type aramid fibers tend to remain long and intact after manufacture, which significantly reduces the coefficient of friction between the pulley engaging surfaces and the pulley. This may result in belt slippage in use.

The use of para-type aramid fibers also introduces a potential problem. While these fibers are effective in preventing slipping and noise generation, when embedded as described above, they tend to promote peeling of the rubber between the short fiber and rubber interface after a relatively short operating time, depending upon the quantity of the fibers therein. This peeling distorts the shape of the ribs on the belt, which may cause vibration and/or weaken the belt to the point that it fails.

SUMMARY OF THE INVENTION

A power transmission belt is provided having a body with a length and laterally oppositely facing pulley engaging surfaces. The body has at least a portion thereof that is made from rubber. Aramid fibers are embedded in the rubber portion of the body in an amount of 5–20 pans by weight, and more preferably 8–15 pans by weight, of aramid fiber per 100 parts by weight of rubber.

In one form, the aramid fibers are para-type aramid fibers.

In one form, the para-type aramid fibers have portions that project from the laterally oppositely facing pulley engaging surfaces on the body. These portions may be fibrillated.

The fibers in the belt may be only para-type aramid fibers or a combination of para-type aramid fibers and non-para-type fibers.

In the event that the fibers are a combination of para-type aramid fibers and non-para-type aramid fibers, preferably the ratio of para-type aramid fibers to non-para-type aramid fibers is 1:1–5.

In one form, the para-type aramid fibers are each monofilaments having a length of 2–6 mm.

The projection of the portions of the para-type aramid fibers is preferably no more than 0.5 mm from the laterally oppositely facing pulley engaging surfaces.

In those embodiments in which the projecting portions of the fibers are fibrillated, the individual fibrils preferably have a diameter between one-eighth to one-half the diameter of the para-type aramid fibers. The individual fibrils may cud at the belt side surfaces.

The para-type aramid fibers may in turn each be a monofilament having a diameter of 9–18 μm.

In one form, the para-type aramid fibers are at least one of (a) aramid fiber sold commercially under at least one of the trademarks "Twaron" and "Kevlar", (b) a blend of synthetic fiber thread of para-type aramid fiber thread and a monofilament that is at least one of nylon, vinylon, and polyester, and (c) a blend of para-type aramid fiber thread and natural fiber thread such as cotton and pulp.

The power transmission belt, according to the present invention, may be a V-ribbed belt or another type of belt.

Typically, such a belt has a tension layer, a compression layer, and longitudinally extending load carrying cords in the body between the tension layer and the compression layer. A stretchable, rubber impregnated canvas layer can be provided on one of the inside and outside surfaces of the body.

In the event of a V-ribbed construction, the belt body defines at least one rib and the para-type aramid fibers extend laterally in the at least one rib.

With the above construction, it has been found that noise generation is minimized with highly tensioned belts, particularly in the presence of water. Belt performance is satisfactorily maintained with the inventive belt construction, even though durability is slightly reduced with an increase in belt hardness, due to the embedded fibers.

In another form of the invention, a power transmission belt is provided having a body with a length and laterally oppositely facing pulley engaging surfaces. The body has at least a portion thereof that is made from rubber. Para-type aramid fibers are embedded in the rubber portion of the body and have a portion projecting from the laterally oppositely facing pulley engaging surfaces on the body. The projecting portions of the para-type aramid fibers are fibrillated so as to define discrete fibrils.

BRIEF DESCRIPTION OF THE DRAWINGS

FIG. 1 is a fragmentary, cross-sectional, perspective view of a V-ribbed belt having laterally extending para-type aramid fibers embedded therein, according to the present invention;

FIG. 2 is an enlarged, end elevation view of one of the fibers showing a free end portion thereof that projects from the pulley engaging surface and is fibrillated;

FIG. 3 is a reproduction of a standard-type electron microscope photograph of a pulley engaging side surface on the belt in FIG. 1;

FIG. 4 is a schematic representation of a system for running a belt to test for noise generation;

FIG. 5 is a schematic representation of a system for running a belt to conduct tests in the presence of water;

FIG. 6 is a graph showing the relationship between the rotational velocity of a drive pulley and belt tension for different belt constructions;

FIG. 7 is a schematic representation of a system for running a belt at high temperatures and high speed to conduct an endurance test; and FIG. 8 is a magnified photograph of a pulley engaging side surface, similar to that in FIG. 3, with embedded and exposed meta-type aramid fibers.

DETAILED DESCRIPTION OF THE DRAWINGS

In FIGS. 1 and 2, a V-ribbed belt is shown at 10, having incorporated therein laterally extending, reinforcing fibers 12, according to the present invention. It should be understood that the belt 10 shown is only an exemplary form. The inventive concept can be practiced with other different styles and configuration of belt. The belt 10 has a layer 13 defining a tension section 14, a neutral cushion robber section 16, and part of a compression section 18. The sections 14, 16, 18 cooperatively define a body 20 that has a length, in the direction of the double-headed arrow 22, and a width, in the direction of the double-headed arrow 24.

Laterally spaced, longitudinally extending, load carrying cords 26 are embedded in the cushion robber section 16. These cords 26 have low ductility and are preferably made from polyester, nylon, aramid fibers, or the like.

The cushion rubber section 16, in which the cords 26 are embedded, may be formed of chloroprene rubber (CR), hydrogenated nitrile rubber (HNBR), CSM rubber, natural rubber (NR), SBR rubber, butadiene rubber (BR), or the like.

The outer surface 28 of the tension section 14 has one, or a plurality of, stretchable sheets 30 thereon. The sheets 30 are preferably highly elastic, rubber impregnated canvas with woven warp and weft yarns. The yarns may be made from cotton or a blend of cotton yarn and synthetic fiber thread. The yarns are woven to produce a layer that is highly elastic, principally in the longitudinal direction of the belt 10.

The compression section 18, below the layer 13, is preferably formed of the same type of rubber used for the layer 13. A plurality of longitudinally extending, laterally spaced, ribs 32 are defined in the compression section 18. Each rib 32 has laterally oppositely facing surfaces 34, 36 to engage with complementarily formed ribs on a cooperating pulley 38. Frictional forces between the ribs 32 and pulley 38 account for power transmission between the belt 10 and pulley 38.

The invention contemplates that the fibers 12 be uniformly mixed in the compression layer 18 in an amount of 5 to 20 pans by weight, and more preferably 8 to 15 pans by weight, for each 100 pans by weight of rubber.

It has been found that inclusion of fiber 12 in an amount less than 5 parts by weight per 100 parts by weight of rubber results in an inadequate amount of exposure of the fibers 12 at the surfaces 34, 36. While belts with this concentration of fiber 12 do have good endurance, it has been found that a belt, so constructed, tends to slip in the presence of water. Further, it has been found that an unsuitable amount of noise is generated in use with the belt highly tensioned.

On the other hand, when the concentration of fibers exceeds 20 parts by weight per 100 weight pans of rubber, the ribs 32 become highly rigid. This higher concentration of fibers 12 does reduce slipping and noise generation. However, the rubber tends to peel away from the fibers 12 at the interface of the short fibers and rubber. This results in cracking of the ribs 32 after a relatively short running time.

In a preferred form, the fibers 12 may be single, para-type aramid fibers (polyparaphenyleneterephthalamide), such as those sold commercially under the trademarks Twaron™ and Kevlar™, or similar fibers. Alternatively, the fibers 12 could be a blend of synthetic fiber thread of para-type aramid fiber thread and a monofilament such as nylon, vinylon, polyester, etc. Still further, the fibers could be a blend of para-type aramid fiber thread and natural fiber thread, such as cotton and pulp.

In forming the ribs 32, according to the invention, a dry-type grinding wheel is used with an 80–200 mesh diamond on the grinding surface that is used to form the exposed robber surfaces with the fiber 12 therein.

Dry grinding using the above type grinding wheel fibrillates the portion 40 of the fiber 12 projecting from the surfaces 34, 36. Para-type aramid fibers at a ground side surface of a belt are fibrillated as shown in FIGS. 2 and 3. In FIGS. 2 and 3, para-type aramid fibers 12 are present in an amount of 8 parts by weight by 100 parts by weight of robber.

The fibers 12 have a diameter (D), preferably in the range of 9 to 18 μm, and a length in the range of 2–6 mm. During the grinding process, the projecting portion 40 of each fiber 12 is split lengthwise thereof so that fibrils 42 are produced having a diameter of one-half to one-eighth the diameter (D) of the fiber 12. During the grinding process, the individual fibrils 42 tend to curl at their ends.

For purposes of comparison, a similar belt construction with short meta-type aramid fibers (polymetaphenyleneisophthalamide) are shown embedded in the same concentration as the para-type aramid fibers, i.e., 8 parts by weight of fiber to 100 parts by weight of robber. The projecting portions of the meta-type aramid fibers are not fibrillated during the grinding process. This can be seen in the magnified photograph in FIG. 8.

The presence of the fibrillated portions 40 of the para-type aramid fibers has proven to be very effective in preventing slipping when the belt and pulley are exposed to water in use. The fibrillated portions have also proven effective in suppressing noise when the belt 10 is highly tensioned.

The invention contemplates that the fibers in the compression section 18 either all be para-type aramid fibers or a combination of para-type aramid fibers and non-para-type aramid fibers. In the latter case, the mixing ratio of para-type aramid fiber to non-para-type aramid fiber is preferably within the range of 1:1–5.

The effectiveness of the present invention will now be demonstrated by results from comparative testing.

TEST 1—HIGH TENSION NOISE TEST

In FIG. 4, a test set-up at 46 includes a drive pulley 48, having a 167.9 mm diameter, and a spaced driven pulley 50, having a diameter of 72.0 mm. The pulleys 48, 50 rotate about parallel axes 52, 54, respectively. Four differently constructed belts 10, 10', each a 5PK1104- type belt, were in turn trained around the drive and driven pulleys 48, 50. Three of the belts 10 were made according to the present invention. One inventive belt 10 had 8 parts by weight of para-type aramid short fibers. A second inventive belt 10 had 12 parts by weight of para-type aramid fiber.

These two belts 10 were compared to a) a third belt 10' having 8 parts by weight of meta-type aramid fibers, such as fibers sold commercially under the trademark Comex™, and b) a fourth belt 10' having para-type aramid fiber in a lesser proportion than is preferred according to the invention.

Initially, an adhesion occurrence acceleration test was performed, with a 30 minute break-in period. The belts were tensioned to 33 kgf/rib and run in the direction of the arrow 55 under the following conditions:

Drive Pulley Speed- 2000 RPM

Driven Pulley Torque- 1.25 kgfm

Thereafter, a noise test was performed under the following conditions:

Drive Pulley Speed- 600 RPM

Driven Pulley Load - None

The test results are shown in the following Table 1:

TABLE 1

| amount of the embedded short fibers (wt parts per 100 wt parts rubber) | belt strength (kgf/rib) | | |
|---|---|---|---|
| | 33 | 25 | 20 |
| para-type aramid fiber (8 parts) | no noise | no noise | no noise |
| para-type aramid fiber (12 parts) | no noise | no noise | no noise |
| para-type aramid fiber (4 parts) | noise | noise | noise |
| meta-type aramid fiber (8 parts) | no noise | no noise | no noise |

It can be seen from the results in Table 1 that compared to the belt 10' containing four parts by weight of para-type aramid fibers, the belts 10 of the present invention produced no noise, even when the belt tension was changed.

TEST 2—BELT TENSION TEST WITH SLIP OF 2%

The set-up for this test is shown at 58 in FIG. 5. The test set-up includes a drive pulley 60, having a 120 mm diameter, a driven pulley 62, having a 120 mm diameter, and a tensioning pulley 64, having a 45 mm diameter. These pulleys were rotated around parallel axes 66, 68, 70, respectively.

Four different belt constructions, of the 3PK1100 type, were consecutively tested on the set-up 58.

These belts 10, 10' had the same fiber type and ratio of fiber to rubber as the four belts used in Test 1.

The belts 10, 10' were wound around the tensioning pulley 64 so that the wrap angle α was 90°. The speed of the driven pulley 62 was varied while water was directed against the belt as shown by the arrow 71, advancing in the direction of the arrow 72, in an amount of 100 ml/minute. The water was introduced at the point where the belt contacts the pulley 62.

With a slip of 2%, the belt tension was measured. The results are shown on the graph in FIG. 6.

These results show that, compared to conventional belts 10', the inventive belts 10 slip as easily, even at a low belt tension.

TEST 3—BELT ENDURANCE TEST

For this test, an additional set-up was used as shown at 74 in FIG. 7. The set-up 74 has a drive pulley 76 with a 120 mm diameter, a driven pulley 78 with a 120 mm diameter, and a tensioning pulley 80 having a 55 mm diameter. The pulleys 76, 78, 80, rotate in operation about parallel axes 82, 84, 86.

The four previously mentioned, 3PK1100 type belts 10, 10' were tested at an ambient temperature of 100° C. A load of 11 ps was applied to the driven pulley 78. The tensioning pulley 80 was adjusted so that the belt tension was 50 kgf/3PK. With the drive pulley 76 rotated at a speed of 4900 RPM in the direction of the arrow 90, durability was measured. The test results are shown in Table 2 below.

TABLE 2

| amount of the embedded short fibers (wt parts per 100 wt parts rubber) | endurance ratio |
|---|---|
| para-type aramid fiber (8 parts) | 0.9 |
| para-type aramid fiber (12 parts) | 0.7 |
| para-type aramid fiber (4 parts) | 1.0 (std) |

TABLE 2-continued

| amount of the embedded short fibers (wt parts per 100 wt parts rubber) | endurance ratio |
|---|---|
| meta-type aramid fiber (8 parts) | 0.9 |

As can be seen from the results, the belts 10 of the present invention have a durability of 70–90% of other belts 10'. However, this slight reduction in durability does not interfere with the operation of these belts in the normal operating environment.

As can be seen from the above tests, even when the belt tension is low, slipping did not occur, so that it was not necessary to increase the belt tension to an extent that causes belt fatigue. The inventive belts were capable of providing the necessary power transmission capability.

The foregoing disclosure of specific embodiments is intended to be illustrative of the broad concepts comprehended by the invention.

I claim:

1. A power transmission belt comprising:
   a body having a length and laterally oppositely facing pulley engaging surfaces,
   said body having at least a portion thereof that is made from rubber,
   there being a plurality of aramid fibers embedded in the rubber portion of the body in an amount of 5–20 parts by weight of aramid fiber per 100 parts by weight of rubber,
   wherein a plurality of the fibers each have a portion embedded in the rubber portion of the body and a portion projecting from the laterally oppositely facing pulley engaging surfaces on the body,
   wherein only the projecting portions of the plurality of fibers are treated to define discrete fibrils.

2. The power transmission belt according to claim 1 wherein the aramid fibers are embedded in the rubber portion of the body in an amount of 8–15 parts by weight of aramid fiber per 100 parts by weight of rubber.

3. The power transmission belt according to claim 1 wherein the aramid fibers comprise para-type aramid fibers.

4. The power transmission belt according to claim 3 wherein the belt body defines at least one rib having oppositely facing pulley engaging surfaces and the para-type aramid fibers comprise short, laterally extending fibers in the at least one rib.

5. The power transmission belt according to claim 3 wherein there are plurality of laterally extending short fibers embedded in the rubber portion of the body and some but less than all of the short fibers are para-type aramid fibers.

6. The power transmission belt according to claim 1 wherein there are a plurality of laterally extending short fibers embedded in the rubber portion of the body and all of the plurality of laterally extending short fibers embedded in the rubber portion of the body are para-type aramid fibers.

7. The power transmission belt according to claim 1 wherein the power transmission belt is a V-ribbed belt.

8. The power transmission belt according to claim 3 wherein a plurality of the para-type aramid fibers each comprise a monofilament having a length of 2–6 mm.

9. The power transmission belt according to claim 8 wherein a plurality of the para-type aramid fibers each comprise a monofilament having a diameter of 9–18 μm.

10. The power transmission belt according to claim 1 wherein the portions of the para-type aramid fibers embedded in the rubber portion of the body have a diameter and a plurality of the fibrils on the para-type aramid fibers each have a diameter between one-eighth and one-half the diameter of the portions of the para-type aramid fibers embedded in the rubber portion of the body.

11. The power transmission belt according to claim 3 wherein the para-type aramid fibers comprise at least one of: (a) aramid fiber sold commercially under at least one of the trademarks Twaron™ and Kevlar™; (b) a blend of synthetic fiber thread of para-type aramid fiber thread and a monofilament that is at least one of nylon, vinylon, and polyester; and (c) one blend of para-type aramid fiber thread and natural fiber thread that is at least one of cotton and pulp.

12. The power transmission belt according to claim 1 wherein some of the fibers are para-type aramid fibers and some of the fibers are non-para-type aramid fibers and the ratio of para-type aramid fibers to non-para-type aramid fibers is 1:1–5.

13. The power transmission belt according to claim 3 wherein the projecting portions of the para-type aramid fibers project no more than 0.5 mm from the laterally oppositely facing pulley engaging surfaces.

14. The power transmission belt according to claim 3 wherein the fibrils comprise curled unmelted fibrils.

15. The power transmission belt according to claim 1 wherein the body has inside and outside surfaces, a tension section and a compression section, there are longitudinally extending load carrying cords in the body between the tension section and the compression section and there is at least one stretchable, rubber-impregnated canvas layer on at least one of the inside and outside surfaces of the body.

16. A power transmission belt comprising:
    a body having a length and laterally oppositely facing pulley engaging surfaces,
    said body having at least a portion thereof that is made from rubber,
    there being para-type aramid fibers embedded in the rubber portion of the body,
    said para-type aramid fibers each having a portion embedded in the rubber portion of the body and a portion projecting from the laterally oppositely facing pulley engaging surfaces on the body,
    said projecting portions of the para-type aramid fibers being fibrillated so as to define discrete fibrils,
    said embedded portions of the para-type aramid fibers being substantially unfibrillated.

17. The power transmission belt according to claim 16 wherein the para-type aramid fibers have a length of 2–6 mm.

18. The power transmission belt according to claim 16 wherein the para-type aramid fibers each have a diameter of 9–18 μm.

19. The power transmission belt according to claim 16 wherein the portions of the para-type aramid fibers embedded in the rubber portions of the body have a diameter and the discrete fibrils have a diameter between one-eighth and one-half the diameter of the portions of the para-type aramid fibers embedded in the rubber portion of the body.

20. The power transmission belt according to claim 16 wherein the projecting portions of the para-type aramid fibers project no more than 0.5 mm from the laterally oppositely facing pulley engaging surfaces.

21. The power transmission belt according to claim 16 wherein there are a plurality of non-para-type aramid fibers embedded in the rubber portion of the body and the ratio of para-type aramid fibers to non-para-type aramid fibers is 1:1–5.

22. The power transmission belt according to claim 16 wherein a plurality of the discrete fibrils are unmelted and curled.

* * * * *